(12) United States Patent
Friedrich

(10) Patent No.: US 6,580,996 B1
(45) Date of Patent: Jun. 17, 2003

(54) VEHICLE ADAPTIVE CRUISE CONTROL SYSTEM AND METHOD

(75) Inventor: Mark P. Friedrich, Macomb Township, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/214,491

(22) Filed: Aug. 7, 2002

(51) Int. Cl.[7] .............................. G05D 1/00; G06F 7/00; G06F 17/00; G06F 19/00
(52) U.S. Cl. .......................... 701/96; 701/93; 701/118; 701/36; 701/117; 701/119; 701/301; 180/170; 342/70; 780/304
(58) Field of Search ............................. 701/96, 93, 94, 701/36, 117, 118, 119, 301; 180/170; 342/70, 73; 700/304

(56) References Cited

U.S. PATENT DOCUMENTS

| | | | |
|---|---|---|---|
| 5,629,851 A | 5/1997 | Williams et al. | 180/170 |
| 5,901,806 A | 5/1999 | Takahashi | 701/93 |
| 5,999,874 A | 12/1999 | Winner et al. | 364/426.044 |
| 6,094,616 A | 7/2000 | Andreas et al. | 701/93 |
| 6,192,309 B1 | 2/2001 | Prestl et al. | 701/96 |
| 6,233,515 B1 | 5/2001 | Engelman et al. | 701/96 |

FOREIGN PATENT DOCUMENTS

JP 404244434 A 9/1992

*Primary Examiner*—Thomas G. Black
*Assistant Examiner*—Ronnie Mancho
(74) *Attorney, Agent, or Firm*—MacMillan, Sobanski & Todd, LLC

(57) ABSTRACT

An automatic cruise control system and method for a host vehicle that includes a vehicle follow mode when the host vehicle detects an in-path vehicle and an auto-resume mode for accelerating to a driver set speed upon elimination of the in-path vehicle from the host vehicle path. The auto-resume mode includes a determination of the traffic density around the host vehicle and reduces the rate of acceleration for higher traffic densities.

10 Claims, 3 Drawing Sheets

VEHICLE ADAPTIVE CRUISE CONTROL SYSTEM AND METHOD

BACKGROUND OF INVENTION

The present invention relates to a vehicle equipped with an automatic cruise control system, and more particularly to a vehicle with an automatic cruise control system having an automatic acceleration mode.

Cruise control systems for automotive vehicles have been available for years. Typically, for the basic systems, the vehicle driver attains the desired vehicle speed and initiates the cruise control system at a driver selected set speed. The vehicle then travels at the set speed unless the driver applies the brakes or turns off the system. With advances in vehicle electronics and sensor technology, adaptive cruise control (ACC) systems are becoming available that not only maintain the set vehicle speed, but also include an object sensing technology, such as radar, laser or other type of sensing system, that will detect an in-path vehicle. If the host vehicle is following too closely behind an in-path vehicle, the ACC will automatically reduce the host vehicle speed (by reducing the throttle and/or applying the brakes) sufficiently to obtain a predetermined safe following interval (which may be based on following distance and/or following time). The ACC will then continue to maintain the safe following interval.

Once the slower moving in-path vehicle moves out of the path, or speeds up sufficiently, and no other new in-path vehicle is detected, the host vehicle will automatically begin accelerating back up to the driver selected set speed-an auto-resume function. While the auto-resume is convenient for the driver, the driver may feel a sense of alarm if the vehicle is in heavy traffic and the automatic acceleration is too fast. But, on the other hand, if the automatic acceleration is set at a low rate (to avoid the feeling of alarm), then, when the host vehicle is traveling in light traffic and begins the automatic acceleration, the driver may be impatient with the slow rate of acceleration.

Thus, it is desirable for a vehicle with an ACC system and auto-resume to accelerate appropriately for the level of traffic around the vehicle in order to minimize driver unease with a high rate of acceleration in heavy traffic and impatience with a low rate of acceleration in light traffic.

SUMMARY OF INVENTION

In its embodiments, the present invention contemplates a method of operating a host vehicle having adaptive cruise control comprising the steps of: operating the host vehicle in the adaptive cruise control mode at a preset speed; encountering an in-path vehicle in the path of the host vehicle; slowing the host vehicle to maintain a predetermined vehicle following interval; sensing when the in-path vehicle is not in the path of the host vehicle such that the host vehicle may begin to return to the preset speed; beginning automatic acceleration mode; determining a traffic density adjacent to and in front of the host vehicle; and accelerating at one of at least two predetermined acceleration rates based upon the determined traffic density.

The present invention further contemplates an automatic cruise control system for a host vehicle. The automatic cruise control system includes an object sensing system that includes at least one object detector capable of detecting other vehicles in front of and adjacent to the host vehicle, a set speed selector capable of selecting a set speed for the host vehicle, and a vehicle follower capable of following behind an in-path vehicle at a predetermined interval. The system also includes an auto-resume accelerator capable of accelerating the host vehicle to the set speed, a traffic density determiner capable of determining a value for traffic density, and an auto-resume acceleration limiter capable of limiting the rate of acceleration caused by the auto-resume accelerator based on the value of traffic density generated by the traffic density determiner.

An advantage of the present invention is that the acceleration of an ACC equipped vehicle with auto-resume is adjusted to account for the density of vehicles around that vehicle. This will allow for a more acceptable driving experience for the driver of the ACC vehicle by avoiding too fast of acceleration in heavy traffic situations and too slow of acceleration in light traffic situations.

Another advantage of the present invention is that a slower acceleration rate for an auto-resume may be more appropriate in heavy traffic situations since the likelihood of unexpected maneuvers by nearby vehicles that causes them to move in-path of the ACC vehicle are increased. This, then, allows more time for the ACC system to detect a new in-path vehicle and switch to a vehicle following mode.

DETAILED DESCRIPTION

Figure 1:
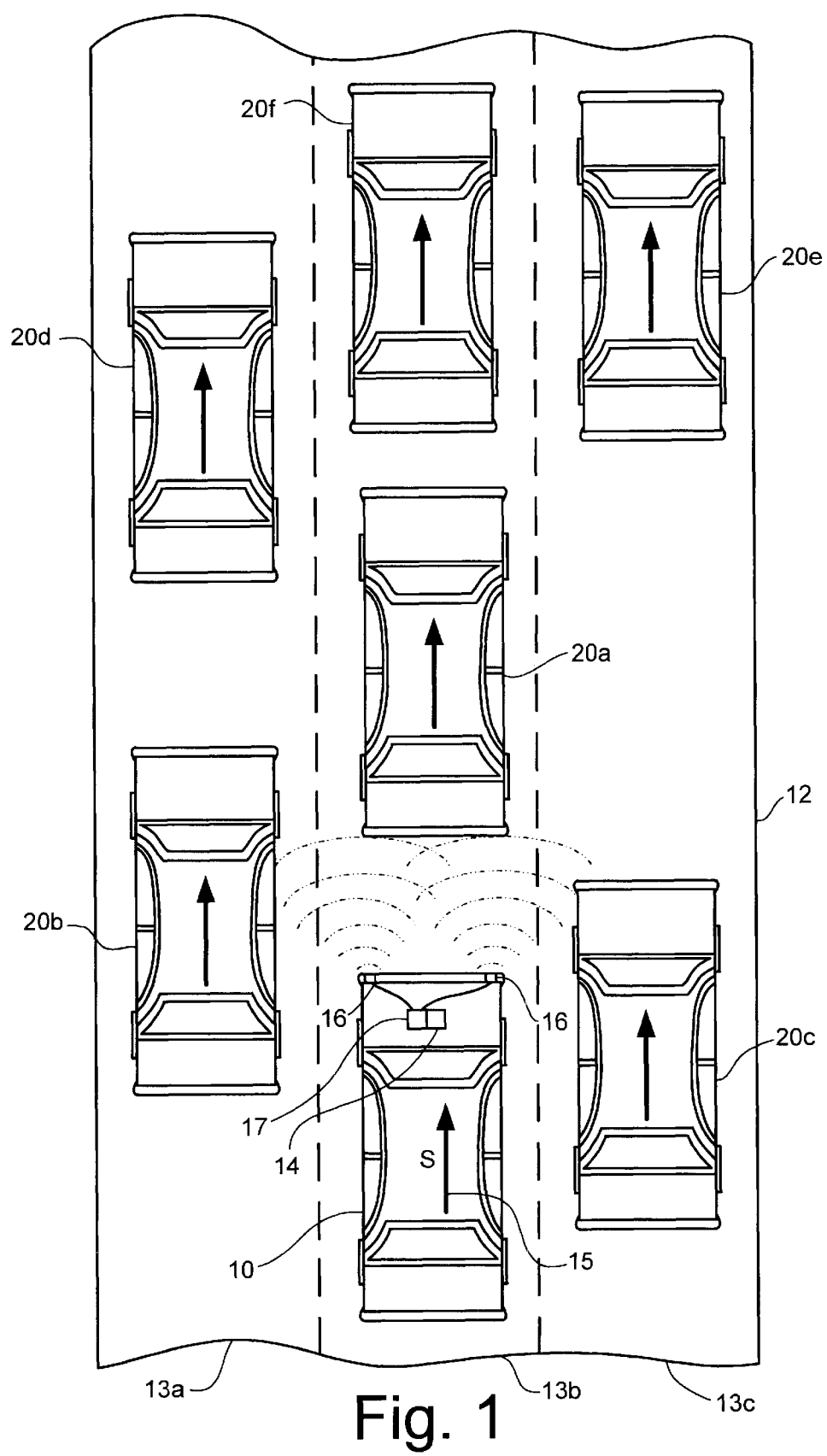
FIG. 1 Is a schematic view of an automatic cruise control equipped vehicle traveling among other vehicles in a follow mode, in accordance with the present invention.

FIG. 1 illustrates a host vehicle 10 traveling on a road 12, with three lanes 13a–13c, in the direction of arrow 15, at a speed S. The host vehicle 10 has an automatic cruise control (ACC) system 14, connected to a pair of object sensors 16 of an object sensing system 17. These sensors 16 may be radar, laser, or other similar types of sensors able to track the location and distance to objects surrounding the host vehicle 10. In this case, the objects are other vehicles 20a–20f, that are adjacent to or in front of the host vehicle 10. The arrows on the surrounding vehicles 20a–20f indicate the general direction of travel for these vehicles. While FIG. 1 shows two sensors 16 on the host vehicle 10, there may be any number of sensors (one or more), as are needed to detect and track multiple vehicles 20a–20f. Vehicle 20a is an in-path vehicle, so the ACC system 14 is in a follow mode, thus maintaining a predetermined following interval from the in-path vehicle 20a regardless of the driver set speed for the ACC system 14.

Figure 2:
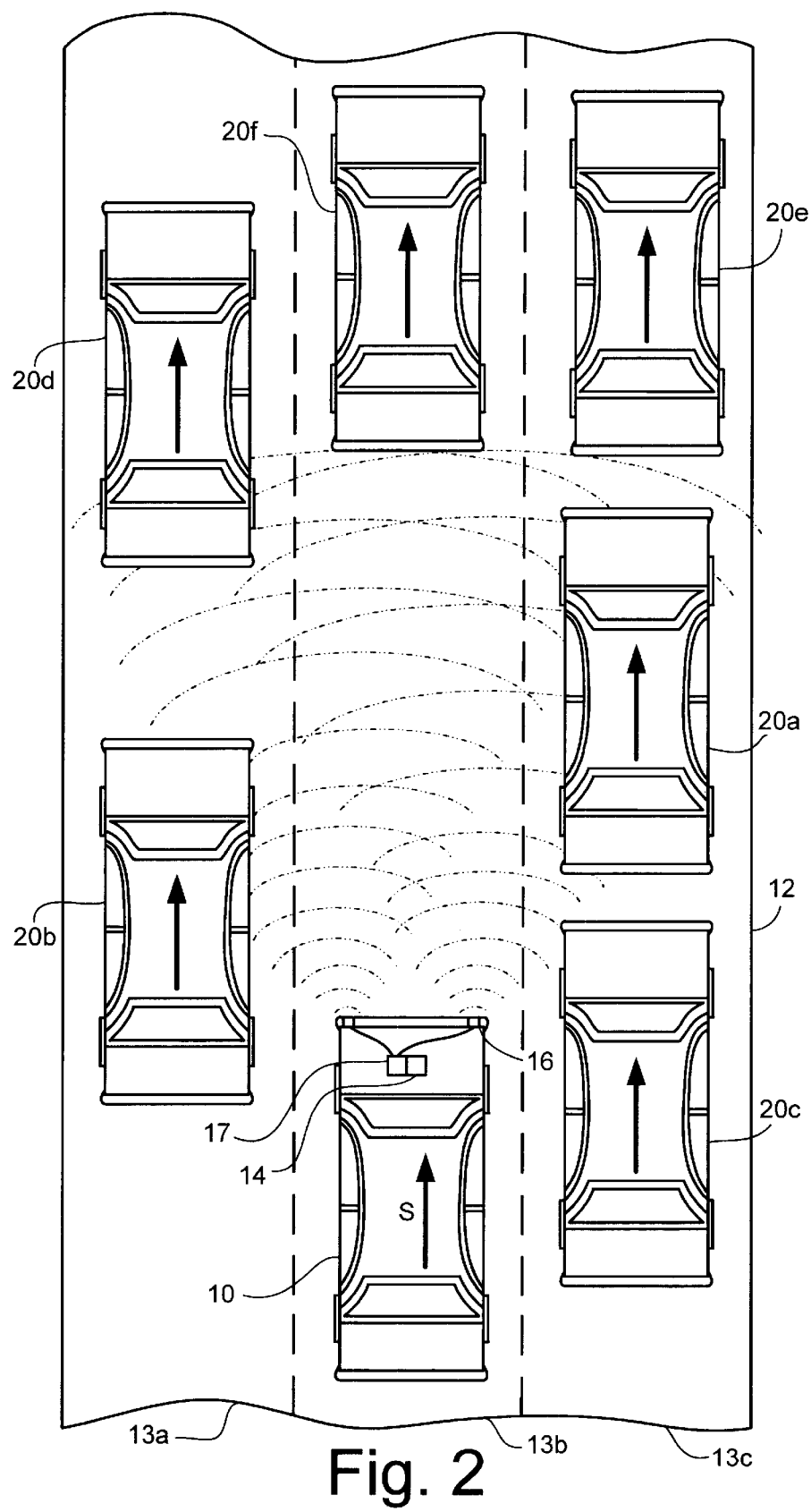
FIG. 2 is a view similar to FIG. 1, but with the ACC equipped vehicle traveling in automatic acceleration mode.

FIG. 2 is similar to FIG. 1, but illustrates when the in-path vehicle 20a has moved out of the path of the host vehicle 10. The ACC system 14 of the host vehicle 10 is now ready to implement an automatic acceleration up to the driver set speed (auto-resume). The object sensing system 17 detects and tracks the nearby vehicles 20a–20 in adjacent lanes 13a, 13c, as well as vehicles 20f that are in the same lane 13b, but are far enough ahead of the host vehicle 10 to be out of control range of the follow mode algorithm. The number and proximity of these vehicles 20a–20f will be used to calculate the traffic density around the acceleration path of the host vehicle 10.

Figure 3:
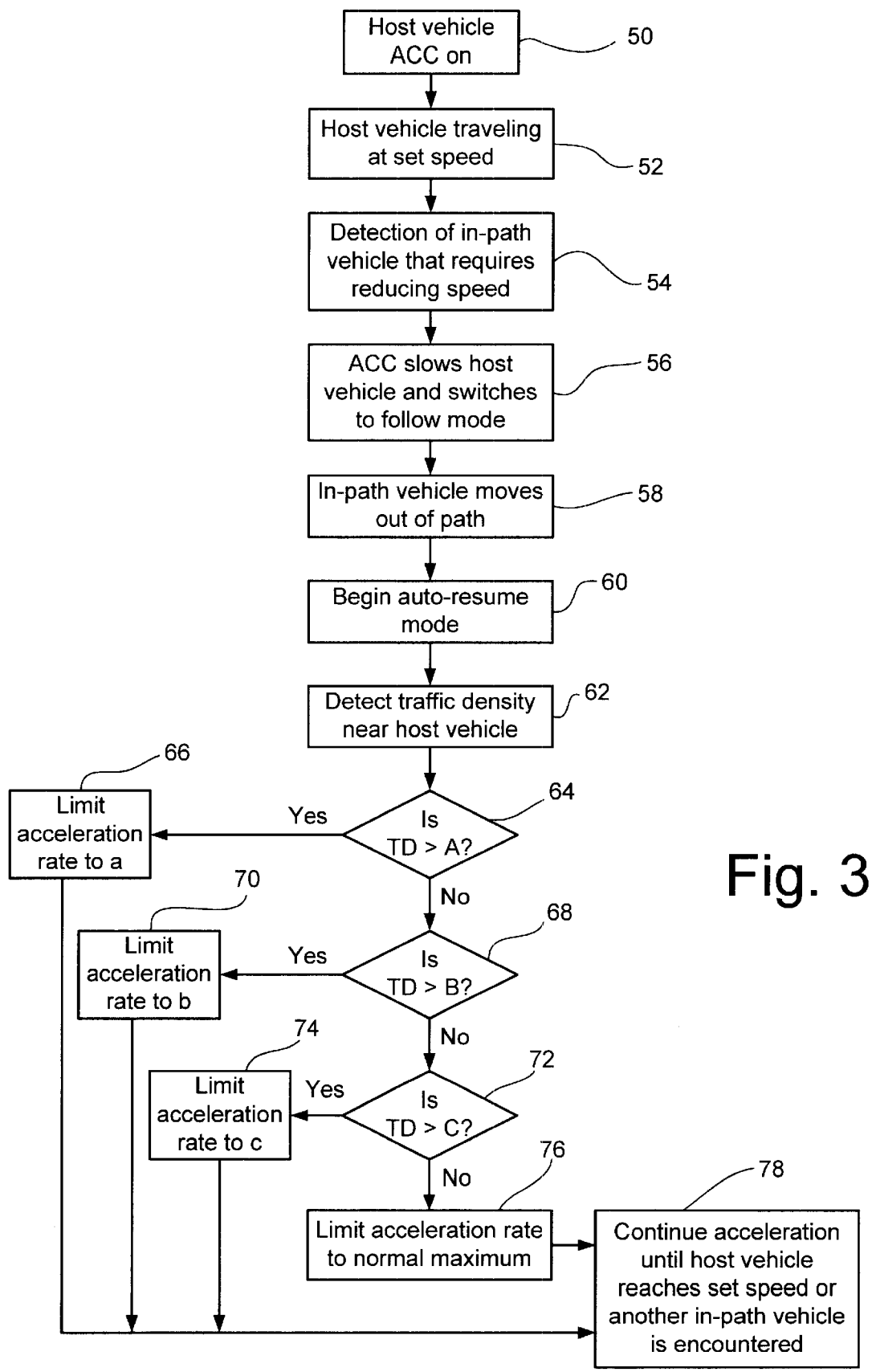
FIG. 3 is a flow diagram illustrating a method of accelerating a vehicle in an automatic acceleration mode in accordance with the present invention.

FIG. 3 generally shows a portion of an automatic cruise control process. The host vehicle is traveling with the ACC system on, block 50, at the driver set speed, block 52. Upon detection of an in-path vehicle that is within the predetermined safe following interval, block 54, the ACC system slows the host vehicle and switches to a follow mode, block 56. The ACC system of the host vehicle will remain in this follow mode until it detects that the in-path vehicle is out of the host vehicle's path, block 58. The ACC system will begin its auto-resume mode, block 60, and employs the object sensing system to detect the traffic density around the host vehicle, block 62.

Since the vehicle operator's comfort level while accelerating is higher when the amount of surrounding traffic is lower, the auto-resume acceleration rate is adjusted generally inversely proportional to the traffic density around the host vehicle -as the surrounding density of vehicles increases, the auto-resume acceleration rate decreases. At this point, the system determines if the traffic density (TD) is above a very high level A, block 64. If it is, then the acceleration rate is limited to a low rate a, block 66. If not, then it is determined if the TD is above a medium high level B, block 68. If it is, then the acceleration rate is limited to a medium low rate b, block 70. If not, then the TD is compared to a medium level C, block 72. If the TD is above level C, then the acceleration rate is limited to c, block 74. If it is not, then the ACC system acceleration rate is limited to its normal maximum rate of acceleration, block 76. Once the level of acceleration is determined, it is continued until the host vehicle reaches the driver set speed or another in-path vehicle is encountered, block 78. The traffic densities of A, B and C and the corresponding acceleration rates of a, b and c can be determined from a mathematical formula or a look-up table. And, while only three rates of traffic density are shown, the system can be configured for any number of ranges of traffic density versus acceleration rate, as is desired.

As an alternative method, one may wish to repeat the steps in blocks 62 to 76 in order to adjust the acceleration rate limit until the host vehicle reaches the set speed or another in-path vehicle is encountered.

While certain embodiments of the present invention have been described in detail, those familiar with the art to which this invention relates will recognize various alternative designs and embodiments for practicing the invention as defined by the following claims.

What is claimed is:

1. A method of operating a host vehicle having adaptive cruise control comprising the steps of:

operating the host vehicle in the adaptive cruise control mode at a preset speed;

encountering an in-path vehicle in the path of the host vehicle;

slowing the host vehicle to maintain a predetermined vehicle following interval;

sensing when the in-path vehicle is not in the path of the host vehicle such that the host vehicle may begin to return to the preset speed;

beginning automatic acceleration mode;

determining a traffic density adjacent to and in front of the host vehicle; and accelerating at one of at least two predetermined acceleration rates based upon the determined traffic density.

2. The method of claim 1 wherein the at least two predetermined acceleration rates is four acceleration rates.

3. The method of claim 1 wherein the predetermined acceleration rates are generally inversely proportional to the determined traffic density.

4. The method of claim 1 wherein the step of accelerating includes acceleration at the one of at least two predetermined acceleration rates until the host vehicle reaches the preset speed or a second in-path vehicle is encountered.

5. The method of claim 1 further including the steps of determining a second traffic density, and accelerating at one of the at least two predetermined acceleration rates based upon the second determined traffic density.

6. A method of operating a host vehicle having adaptive cruise control comprising the steps of:

operating the host vehicle in the adaptive cruise control mode at a preset speed;

encountering an in-path vehicle in the path of the host vehicle;

slowing the host vehicle to maintain a predetermined vehicle following interval;

sensing when the in-path vehicle is not in the path of the host vehicle such that the host vehicle may begin to return to the preset speed;

beginning automatic acceleration mode;

determining a traffic density adjacent to and in front of the host vehicle; and accelerating at one of at least two predetermined acceleration rates based upon the determined traffic density until the host vehicle reaches the preset speed or a second in-path vehicle is encountered.

7. The method of claim 6 wherein the at least two predetermined acceleration rates is four acceleration rates.

8. The method of claim 6 wherein the predetermined acceleration rates are generally inversely proportional to the determined traffic density.

9. An automatic cruise control system for a host vehicle comprising:

an object sensing system that includes at least one object detector capable of detecting other vehicles in front of and adjacent to the host vehicle;

a set speed selector capable of selecting a set speed for the host vehicle;

a vehicle follower capable of following behind an in-path vehicle at a predetermined interval;

an auto-resume accelerator capable of accelerating the host vehicle to the set speed;

a traffic density determiner capable of determining a value for traffic density;

an auto-resume acceleration limiter capable of limiting the rate of acceleration caused by the auto-resume accelerator based on the value of traffic density generated by the traffic density determiner.

10. The automatic cruise control system of claim 9 wherein the object detector includes at least one radar sensor.

* * * * *